United States Patent
Porte et al.

(10) Patent No.: US 9,261,021 B2
(45) Date of Patent: Feb. 16, 2016

(54) TURBINE ENGINE FOR AIRCRAFT

(75) Inventors: Alain Porte, Colomiers (FR); Fabrice Gantie, Toulouse (FR); Frederic Chelin, Encausse (FR); Patrick Oberle, Verdun sur Garonne (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 1268 days.

(21) Appl. No.: 12/307,886

(22) PCT Filed: Jul. 4, 2007

(86) PCT No.: PCT/FR2007/001134
§ 371 (c)(1),
(2), (4) Date: Jan. 7, 2009

(87) PCT Pub. No.: WO2008/006961
PCT Pub. Date: Jan. 17, 2008

(65) Prior Publication Data
US 2009/0255589 A1    Oct. 15, 2009

(30) Foreign Application Priority Data

Jul. 12, 2006 (FR) ..................................... 06 06337

(51) Int. Cl.
*F02B 27/00* (2006.01)
*F02C 7/04* (2006.01)
*F02K 3/06* (2006.01)

(52) U.S. Cl.
CPC ... *F02C 7/04* (2013.01); *F02K 3/06* (2013.01); *F05D 2240/14* (2013.01); *F05D 2300/603* (2013.01); *Y02T 50/672* (2013.01); *Y10T 137/0536* (2015.04)

(58) Field of Classification Search
USPC .................. 60/226.1; 415/9, 214.1; 137/15.1
See application file for complete search history.

(56) References Cited

U.S. PATENT DOCUMENTS

| | | | |
|---|---|---|---|
| 3,542,152 A | 11/1970 | Adamson | |
| 4,384,453 A * | 5/1983 | Tudor et al. | 60/797 |
| 5,259,724 A * | 11/1993 | Liston et al. | 415/9 |
| 5,782,077 A * | 7/1998 | Porte | 60/782 |
| 2004/0211167 A1* | 10/2004 | Schreiber | 60/226.1 |
| 2005/0252195 A1* | 11/2005 | Porte et al. | 60/226.1 |
| 2006/0024154 A1 | 2/2006 | Costa | |
| 2006/0059889 A1* | 3/2006 | Cardarella, Jr. | 60/226.1 |
| 2008/0206044 A1* | 8/2008 | Porte et al. | 415/119 |
| 2009/0255589 A1* | 10/2009 | Porte et al. | 137/15.1 |
| 2009/0290978 A1* | 11/2009 | Porte et al. | 415/200 |

FOREIGN PATENT DOCUMENTS

| | | |
|---|---|---|
| EP | 1 591 643 | 11/2005 |
| EP | 1 621 752 | 2/2006 |

OTHER PUBLICATIONS

International Search Report dated Oct. 15, 2007 w/ English translation.
Written Opinion of the International Searching Authority with English translation.

* cited by examiner

*Primary Examiner* — Gerald L Sung
(74) *Attorney, Agent, or Firm* — Dickinson Wright PLLC

(57) ABSTRACT

An internal wall of an air intake and a housing of a fan form a single tubular piece made from a fiber/resin composite material. A rear end has the single tubular component connected by a flange and bolts to an external cowl of the fan duct, such that the rear end of the tubular component is uniform and the flange is attached and fixed to the rear end.

3 Claims, 3 Drawing Sheets ately depicted in FIG. 1, has a lon-

TURBINE ENGINE FOR AIRCRAFT

TECHNICAL FIELD OF THE INVENTION

The present invention relates to aircraft turbine engines and, more especially, to the air intake and fan casing of such turbine engines.

BACKGROUND OF THE INVENTION

In known turbine engines, the internal wall of the air intake and the fan casing are made of metal and the rear end of said internal wall of the air intake and the front end of said fan casing have collaborating projecting peripheral flanges so that they can be joined together using fasteners (screws, bolts, etc.) that pass through said flanges.

Given the mechanical, thermal and mass properties of resin/fiber composites, it would be advantageous to be able to produce said internal wall of the air intake and said fan casing entirely in the form of components made of such a composite. However, tests performed toward these ends have not proved beneficial because, in use, the fibers delaminate at the 90° elbow where said peripheral flanges meet the tubular remainder of said internal wall and of said casing, which delamination leads to a substantial reduction in the mechanical strength of said components and even causes them to break.

SUMMARY OF THE INVENTION

It is an object of the present invention to overcome this disadvantage.

To this end, according to the invention, the aircraft turbine engine, which has a longitudinal axis and comprises:
 an air intake, provided with a tubular internal wall; and
 a fan supplied with air by said air intake and enclosed in a casing, also tubular,
is notable in that said internal wall of the air intake and the fan casing form a single tubular component made of a resin/fiber composite.

Thus, by virtue of the present invention, the flanges positioned respectively at the rear end of the internal wall of the air intake and at the front end of the fan casing can be dispensed with. The aforementioned disadvantages associated with the presence of these flanges are therefore entirely eliminated. In addition, an integrated air intake internal wall/fan casing assembly is obtained that is particularly attractive in terms of mass and cost.

Said single tubular component made of composite may be produced using carbon, boron, glass, silicon carbide, etc., fiber, although carbon fiber is preferred. This component may be obtained by any known method (filament winding, coiling, draping of fiber or fabric prepregs, etc.).

At its rear end, said tubular component made of composite may be connected, by a flange and bolts, to the external cowl of the fan duct of said turbine engine.

In such a case, it is advantageous, in order to avoid the aforementioned delamination drawbacks, for the rear end of said tubular component made of composite to be uniform and for said flange to be attached and fixed to said rear end.

BRIEF DESCRIPTION OF THE DRAWINGS

The figures of the attached drawing will make it easier to understand how the invention may be embodied. In these figures, identical references denote elements that are similar.

DETAILED DESCRIPTION OF THE INVENTION

Figure 1:
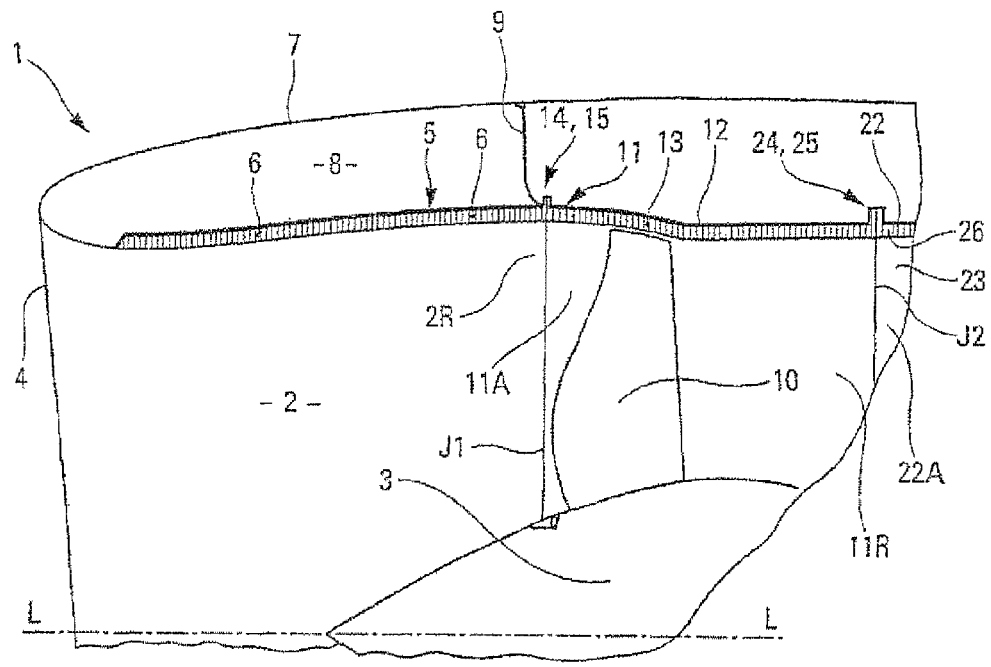
FIG. 1 shows, in partial schematic half section, the front part of a known turbine engine.

The turbine engine of known type 1, the front part of which is schematically and partially depicted in FIG. 1, has a longitudinal axis L-L. This front part essentially comprises a tubular air intake 2 and a fan 3.

The tubular air intake 2 has a leading edge 4 and is provided with a tubular internal wall 5 made of metal, for example aluminum, internally bearing a noise-deadening tubular covering 6. An external cowl 7 surrounds said air intake and with said internal wall 5 delimits a chamber 8 of angular cross section, closed off by an annular rear partition 9 at the opposite end to said leading edge 4.

The fan 3 has blades 10 and is surrounded by a fan casing 11 consisting of a tubular component 12 made of metal, for example aluminum, and internally bearing a noise-deadening tubular covering 13.

The rear end 2R of the air intake 2 and the front end 11A of the fan casing 11 are joined together along a joining plane J1.

Figure 2:
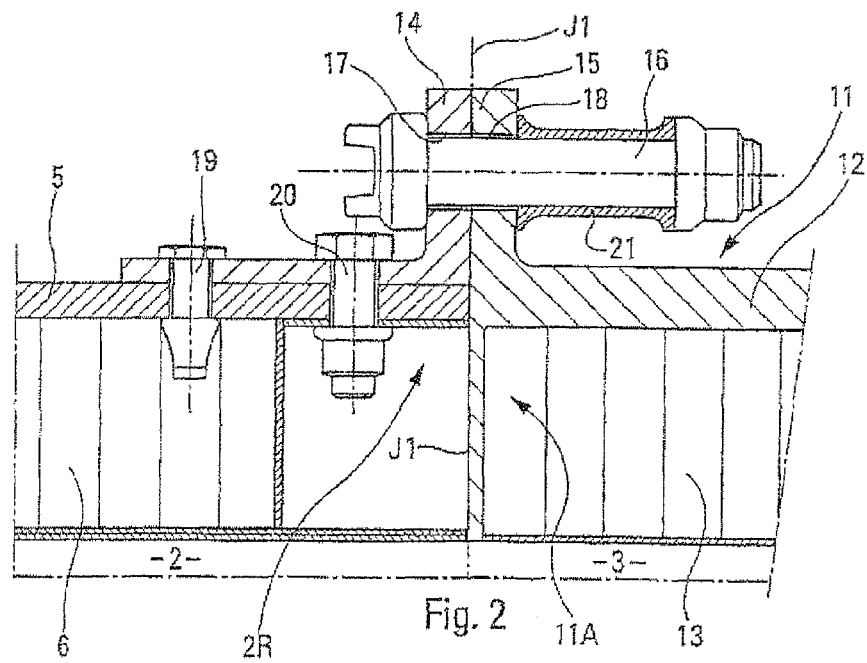
FIG. 2 shows, also in partial schematic half section, one example of how the rear end of the air intake and the front end of the fan casing are joined together in the known turbine engine of FIG. 1.

As shown on a larger scale in FIG. 2, the rear 2R and front 11A ends are assembled using two collaborating annular flanges 14 and 15 projecting outward from the internal wall 5 and the tubular component 12 and pressed together by bolts 16 passing through opposing drillings 17 and 18 made in said flanges 14 and 15. In the known embodiment of FIG. 2, the annular flange 14 is attached to the internal wall 5 and is secured thereto by bolts 19 and 20. By contrast, in this example, the flange 15 is machined as a single piece with the tubular component 12.

Furthermore, associated with each bolt 16 is a sleeve 21, through which said bolt 16 passes and which is secured by this bolt to the flange 15. The sleeves 21 are produced in such a way that they can undergo plastic compression in the axial direction. Thus, when a blade 10 of the fan 3 breaks off and strikes the casing 11, the energy of the impact can be at least partially absorbed by said sleeves 21.

At its rear end 11R, the fan casing 11 is assembled to the front end 22A of the external cowl 22 of the fan duct 23, along the joining plane J2. An assembly such as this is obtained using a system of flanges 24, 25 which is similar to the system of flanges 14, 15, the flange 24 borne by the tubular component 12 being, for example, identical to the flange 15, and it being possible for the flange 25 of the external cowl 22 to have any appropriate shape (see FIG. 5). Of course, bolts (not depicted) are provided for joining said flanges 24 and 25 together.

The external fan cowl 22 internally bears a noise-deadening tubular covering 26.

Figure 3:
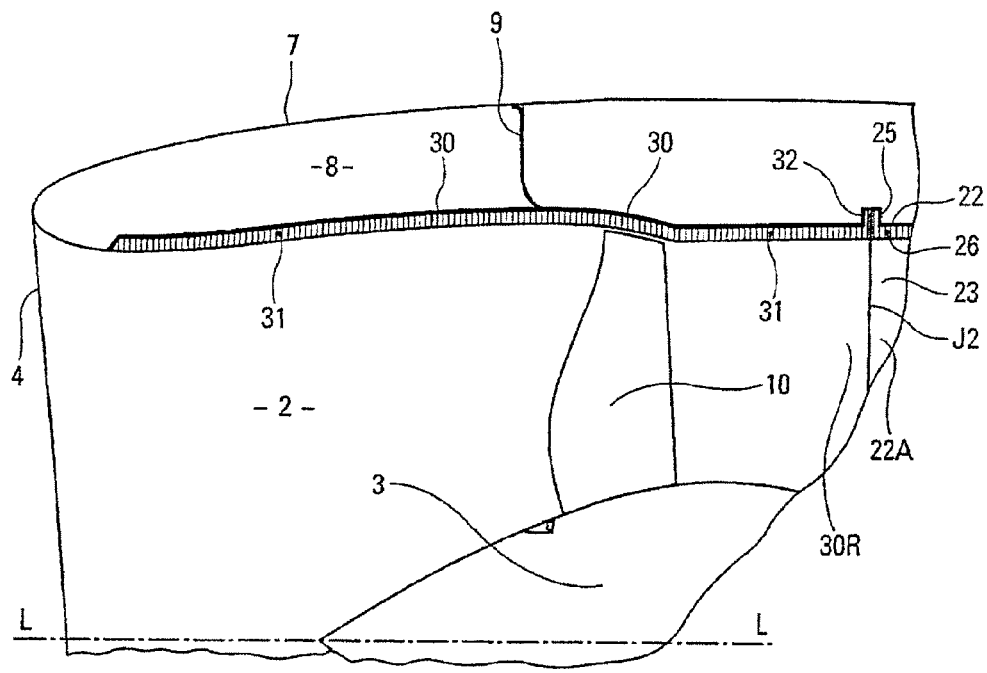
FIG. 3 shows, in a view similar to FIG. 1, the front part of a turbine engine according to the present invention.
Figure 4:
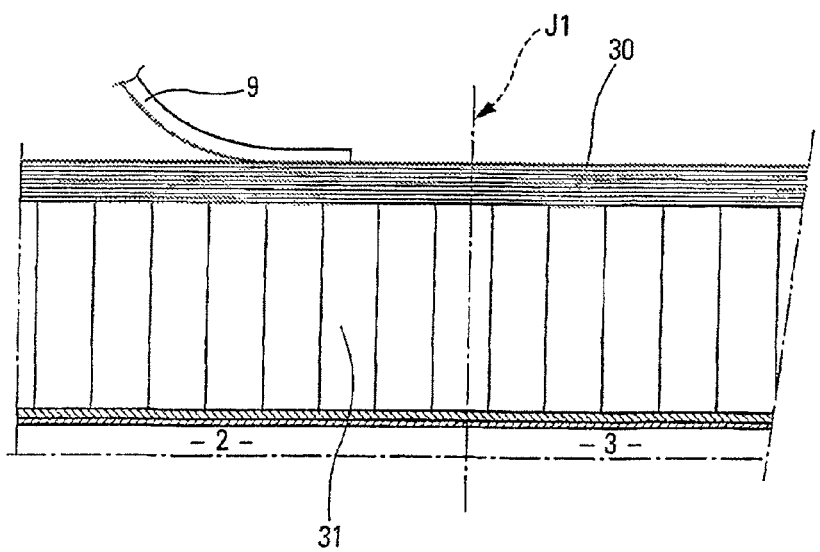
FIG. 4 shows, in an enlarged part section comparable to FIG. 2, the single tubular component made of composite that forms the internal wall of the air intake and the fan cowl of the turbine engine of FIG. 3.

FIG. 3, which schematically depicts the front part of the engine according to the present invention, once again shows the elements 2 to 4, 7 to 10, 22, 22A, 23, 25, 26 and J2 described hereinabove. By contrast, the internal wall 5 of the air intake 2 and the fan casing 11 have been replaced by a single tubular component 30 made of resin/fiber composite which internally bears a noise-deadening tubular covering 31 that replaces the coverings 6 and 13 (see also FIG. 4). As a result, the flanges 14, 15, the bolts 16, 19, 20 and the joining plane J1 have been dispensed with. FIG. 4 also shows the line that the joining plane J1 would have followed had it not been omitted.

Provided at the rear end 30R of the component 30 is a flange 32 intended to collaborate with the flange 25 of the external cowl 22 of the fan duct 23, in order to connect said component 30 to said cowl.

Figure 5:
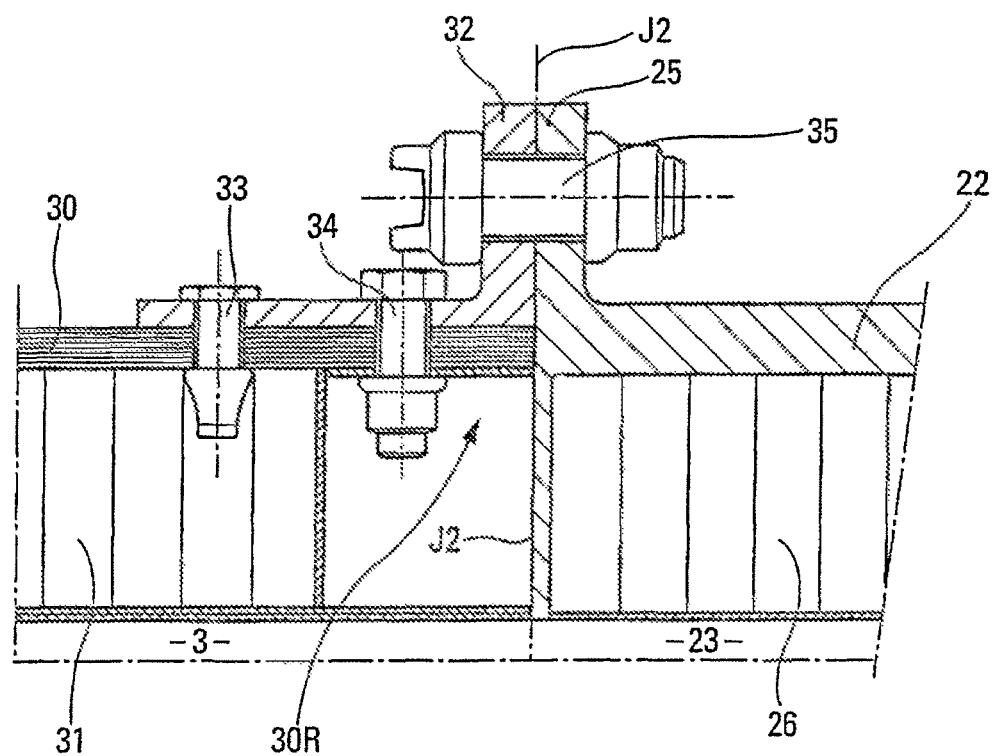
FIG. 5 illustrates, in an enlarged part section, the connection between said single tubular component made of composite and the external cowl of the fan duct.

As may be seen in FIG. 5, the flange 32 consists of an annulus attached to the uniform rear end 30R of said component 30 and fixed thereto by bolts 33, 34. Bolts 35 join the flanges 25 and 32, and therefore the tubular component 30 and the fan duct cowl 22, together.

It will be noted that, if a blade 10 breaks away from the fan 3 and this broken blade strikes the component 30, this component is, through its form and nature, capable of absorbing the energy of the impact.

It will also be noted that the tubular covering 31 may have various regions suited to where they are situated relative to the engine. For example, the tubular covering 31 may be:

of a purely soundproofing nature in the air intake 2,
of a soundproofing and abraidable nature facing the blades 10 of the fans 3 (in order to compensate for the expansion of said blades), and
of a soundproofing and mechanical strong nature behind said blades 10 (in order to withstand impacts from objects, such as pieces of ice, which become detached from said blades).

It will also be noted that the air intake according to the present invention has no break in impedance thus enhancing the overall noise abatement performance of the soundproofing.

The invention claimed is:

1. An aircraft turbine engine, comprising:
   an air intake enclosed by an external cowl and provided with a tubular internal wall;
   a fan casing formed as a single piece tubular component with the tubular internal wall of the air intake, wherein the single piece tubular component is made of a resin/fiber composite;
   a fan having blades surrounded by the single piece tubular component made of the resin/fiber composite; and
   an external fan cowl of a fan duct, with a rear end of said single piece tubular component being uniform and connected by a flange and bolts to a front end of the external fan cowl.

2. The aircraft turbine engine according to claim 1, wherein said resin/fiber composite is a carbon fiber composite.

3. The aircraft turbine of claim 1, wherein the resin/fiber composite internally bears a noise-deadening tubular covering.

* * * * *